United States Patent [19]
McCafferty

[11] Patent Number: 4,911,264
[45] Date of Patent: Mar. 27, 1990

[54] AUTOMOTIVE MECHANIC'S PORTABLE STEP

[76] Inventor: Lawrence E. McCafferty, 605 E. Taylor St., Reno, Nev. 89502

[21] Appl. No.: 275,937

[22] Filed: Nov. 25, 1988

[51] Int. Cl.$^4$ .............................................. B60R 3/00
[52] U.S. Cl. ..................................... 182/92; 182/62; 182/150; 280/163
[58] Field of Search ............... 182/92, 90, 150, 55, 182/62; 114/362; 280/163

[56] References Cited

U.S. PATENT DOCUMENTS

| | | | |
|---|---|---|---|
| 893,930 | 7/1908 | Lederman | 182/150 |
| 2,848,150 | 8/1958 | Tans | 182/150 |
| 2,878,078 | 3/1959 | Moultrop | 182/150 |
| 4,495,883 | 1/1985 | Hoy | 114/362 |
| 4,753,447 | 6/1988 | Hall | 182/92 |
| 4,785,910 | 11/1988 | Tonkovich | 182/92 |

Primary Examiner—Reinaldo P. Machado
Attorney, Agent, or Firm—Herbert C. Schulze

[57] ABSTRACT

A portable step cooperative with the bumper and wheel of large automotive vehicles for use by mechanics, drivers, and service personnel in achieving access to windshields, windows, and engine compartments for servicing: comprising frame means to hang upon and press against a bumper or a large tire with a step means attached thereto and in various forms in a fixed configuration, or in a collapsible configuration, with means to hang upon a mechanics tool box or to be stowed within a truck, bus, or the like directly, the step being formed of slip resistant material and provided with adjustable stops for proper alignment for use upon a bumper or tire, with an adapter for use on a tire integrally or separately provided.

6 Claims, 4 Drawing Sheets

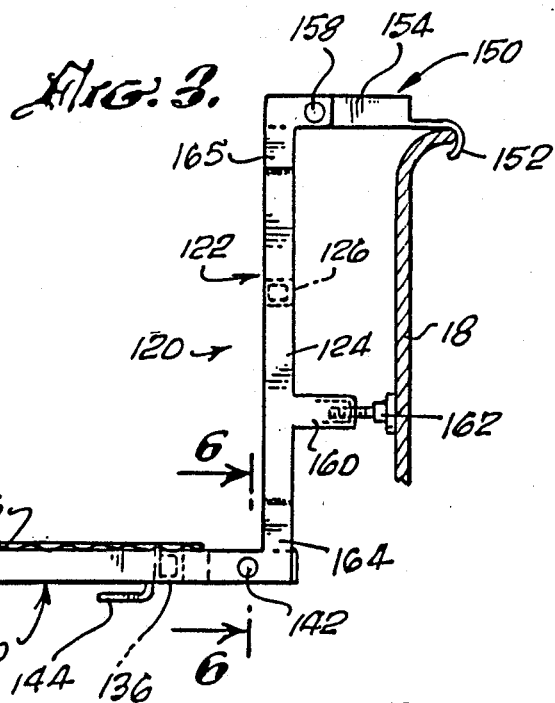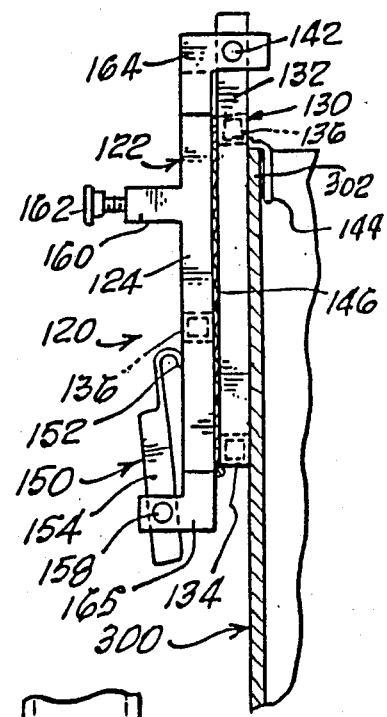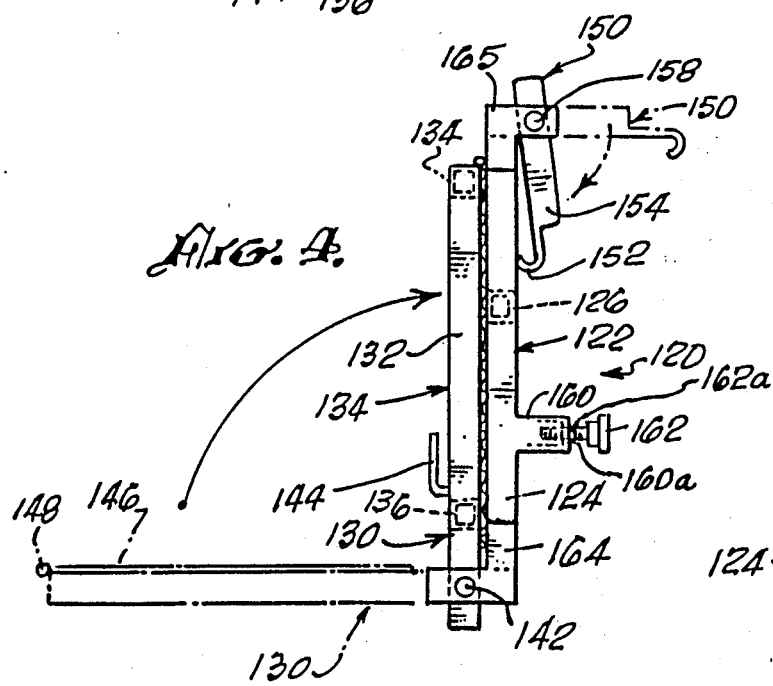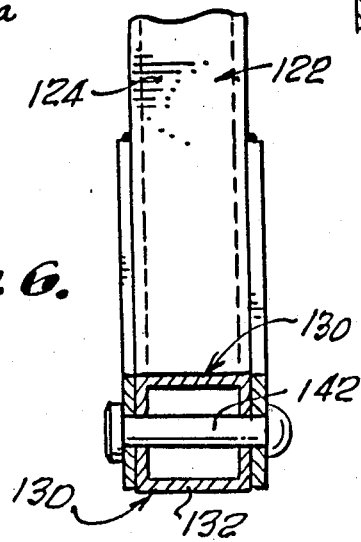

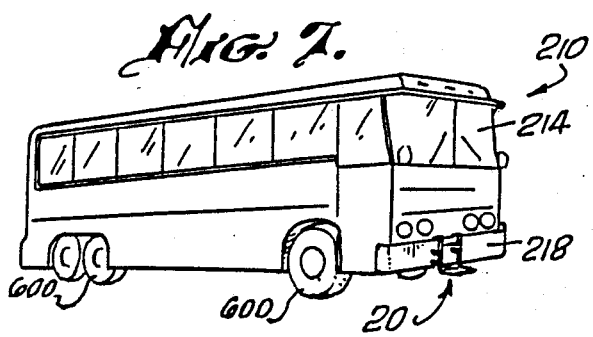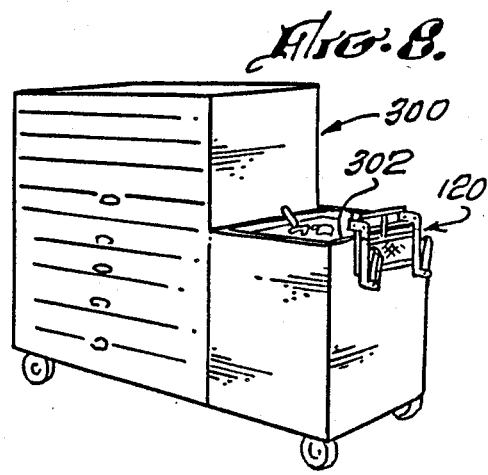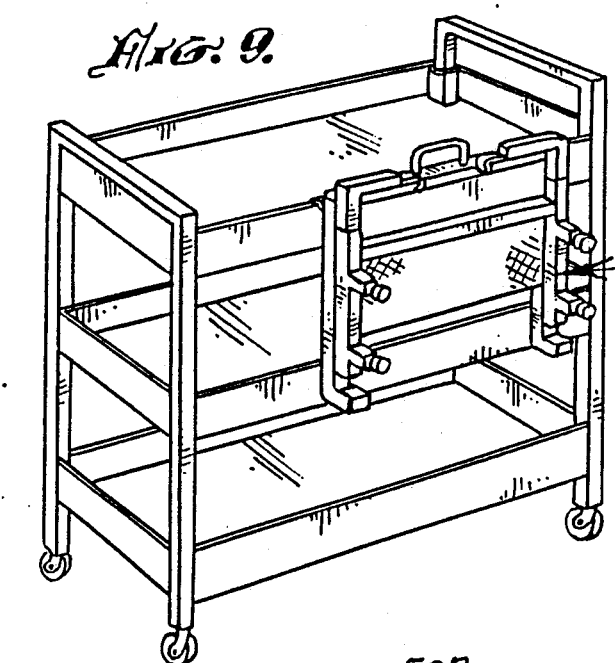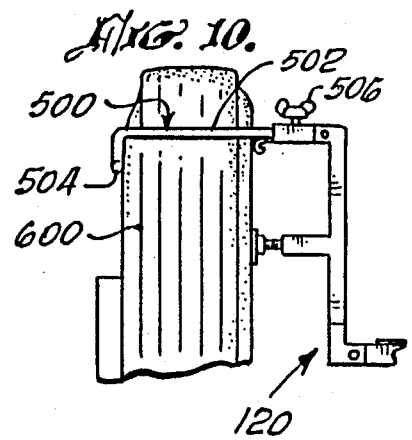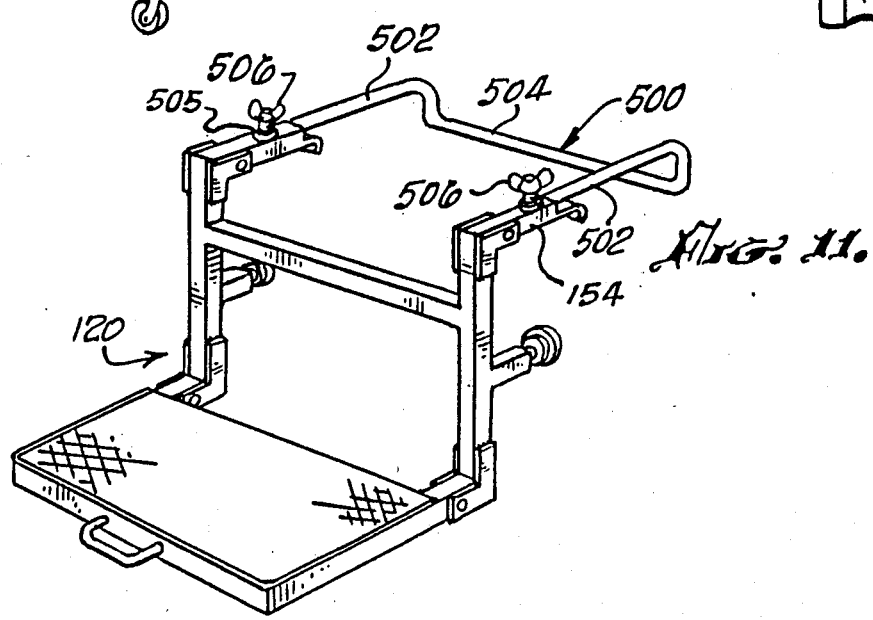

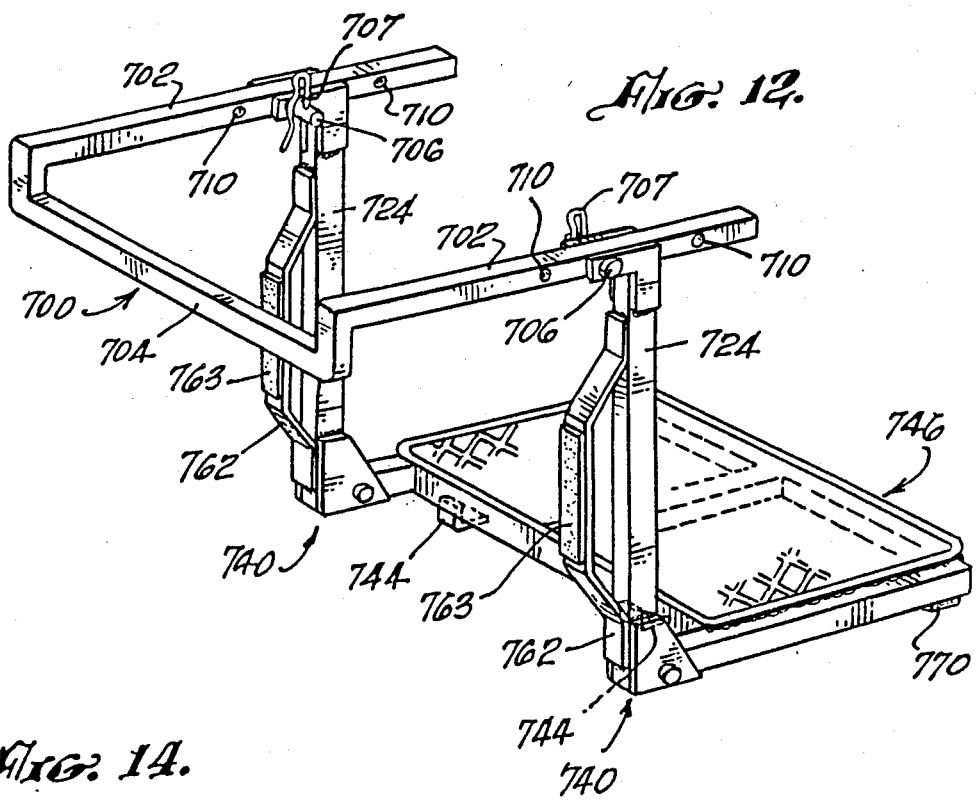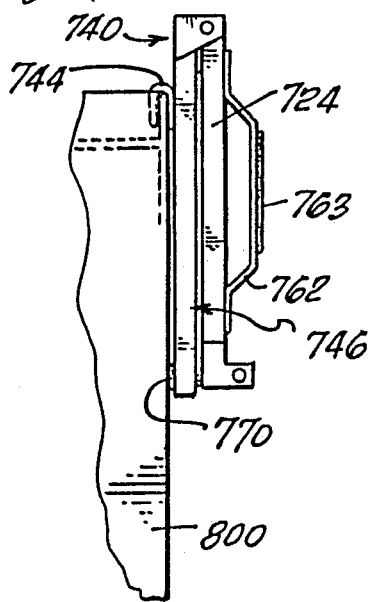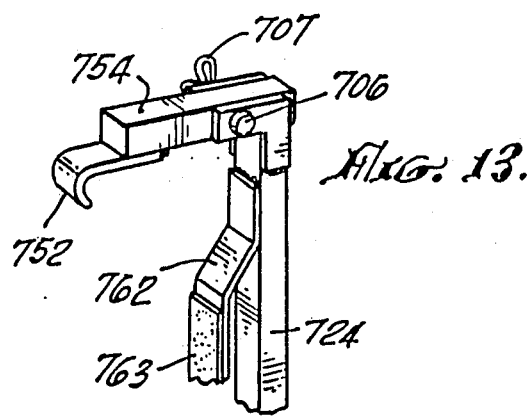

4,911,264

AUTOMOTIVE MECHANIC'S PORTABLE STEP

BACKGROUND OF THE INVENTION

1. Field of the Invention

This invention is in the general field of aids for the use of persons working upon large trucks, buses, and the like;

The invention is even more particularly directed to a portable and movable step to cooperate with the bumpers or tires of large automotive vehicles in such manner that one working on the vehicle may stand at an elevated position for access to windshields, windows, engine areas, and the like;

The device is even more particularly directed to such a step wherein the step may be easily carried and transported and in various configurations may be folded for storage when not in use.

2. Description of the Prior Art

I know of no prior art suitable to perform the function of this invention. Prior art has always consisted of ladders, portable stools which rest upon the floor of a working area, and the like. I know of no portable step cooperative with the bumpers or the like on large automotive vehicles.

SUMMARY OF THE INVENTION

In working upon large trucks, buses, and other automotive vehicles, service personnel, drivers, and mechanics experience great difficulty in such tasks as washing windows, especially windshields, and in performing other necessary maintenance work. The reason for such difficulties is that large vehicles are so arranged that their windshields and many other service areas are at an elevation from the ground level that it is almost impossible to reach them.

In order to reach such areas it has generally been necessary either to use a ladder or a step stool located at the ground level or to try to hang onto a rear view mirror or other portion of the automotive vehicle.

The practices of using step stools, ladders, and the like have not been entirely satisfactory since such items have a tendency to slip away from the vehicle when one is leaning over a truck, bus, or the like from such a device. Further the vehicle may be on uneven or sloping surfaces. This creates an unfavorable working environment as well as a dangerous situation.

I have found that virtually all large trucks, buses, and the like are equipped with bumpers, especially on the front end, which can be engaged, or gripped, by a hook-like device over the top. I have further found that tires on such vehicles can also be gripped by an appropriate gripping device which slips over the tire.

When the gripping or hook-like device is used, a portable step may be incorporated with it such that when in place a person may stand upon the step safely and reach the inaccessible parts of the automotive vehicle. I have found that, for best results, the step itself will be of a material which resists slippage when a person is standing upon it. Also, I have found the best results if the step can be adjusted so as to maintain a relatively horizontal position regardless of the slope or other configuration of the bumper or the like being used.

I have conceived and developed such a step, as briefly described, wherein, in various configurations, the step may be hung upon a bumper or tire or the like as described and service personnel may use it to effectively reach the inaccessible portions of windshields, windows, or other service areas.

I have further found that I am able, with slight modification, to provide a step which is completely collapsible so as to not take up any large space when not in use. The portable step of my invention is safe and adjustable to different bumper configurations or the like.

I have found that, by using the proper material for the standing surface, I can avoid slippage of the feet of the user and thus provide a safe working platform.

It is an object of this invention to provide a device to perform the function stated so as to provide a safe, elevated working platform in conjunction with an automotive vehicle;

Another object of this invention is to provide such a platform as described, which is removable and replaceable upon the vehicle at will;

Another object of this invention is to provide such a device as mentioned which is collapsible so as to require minimum storage space when not in use.

The foregoing and other objects and advantages of this invention will become apparent to those skilled in the art upon reading the description of a preferred embodiment which follows, in conjunction with a review of the appended drawings.

BRIEF DESCRIPTION OF THE DRAWINGS

FIG. 3 is a side elevation of an alternate embodiment of the step of this invention shown in place against a sectioned bumper of the vehicle of FIG. 1;

FIG. 4 is a perspective of the embodiment of this invention shown in FIG. 3, but being collapsed with the original working position shown in phantom;

FIG. 5 is a side elevation of the embodiment of FIG. 3 shown in storage position on a tool box shown broken away and partially in section;

FIG. 6 is an enlarged view, partially in section, of the joint and hinge area of FIG. 4;

FIG. 7 shows the use of the step utilized in FIG. 1 on a different type automotive vehicle;

FIG. 8 is a perspective of the embodiment of FIG. 3 in place upon a mechanic's tool cabinet;

FIG. 9 is a perspective of the device of FIG. 2 in place upon a mechanic's work cart;

FIG. 10 shows the device of FIG. 3 with an adapter mounted upon the tire of a vehicle;

FIG. 11 is a perspective of the full device of FIG. 10 without showing it mounted upon the tire;

FIG. 12 is a perspective of a further alternate embodiment of the device of this invention;

FIG. 13 is a partially broken away view of an upper leg 724 on the bumper hook arrangement 752 of FIG. 12; and FIG. 14 is a side elevation showing the device of FIG. 12 folded and hung on a broken away portion of a mechanics tool box.

DESCRIPTION OF A PREFERRED EMBODIMENT

Figure 1:
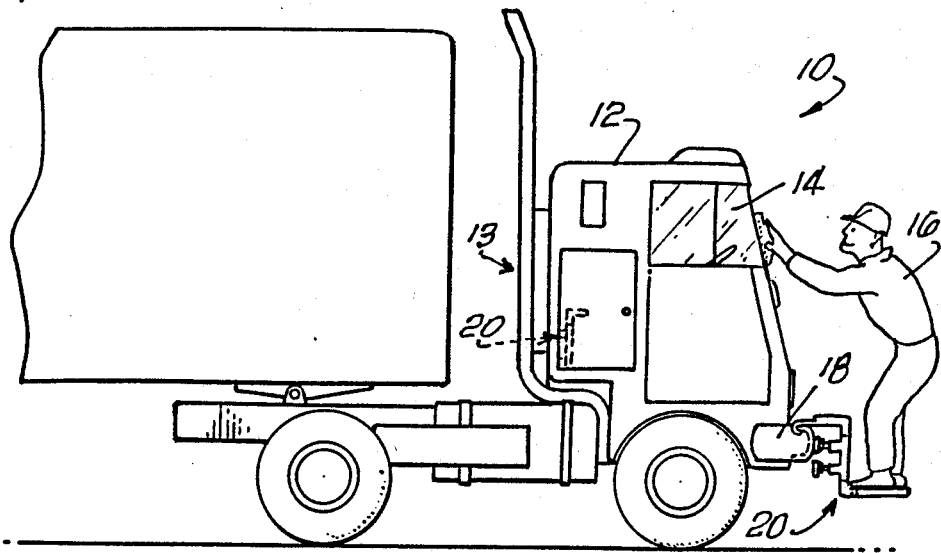
FIG. 1 is a broken away portion of an automotive truck-tractor and trailer with a workman using a preferred embodiment of this invention.

In FIG. 1 there is shown an automotive truck-tractor generally 10 having a cab 12 with a windshield 14 and a carrying compartment 13 with a bumper 18 and an apparatus of this invention 20 being utilized by a workman 16. In phantom the device 20 is shown in the storage compartment 13 which is where it may be carried, folded up so as to take little room, when not being used.

Figure 2:
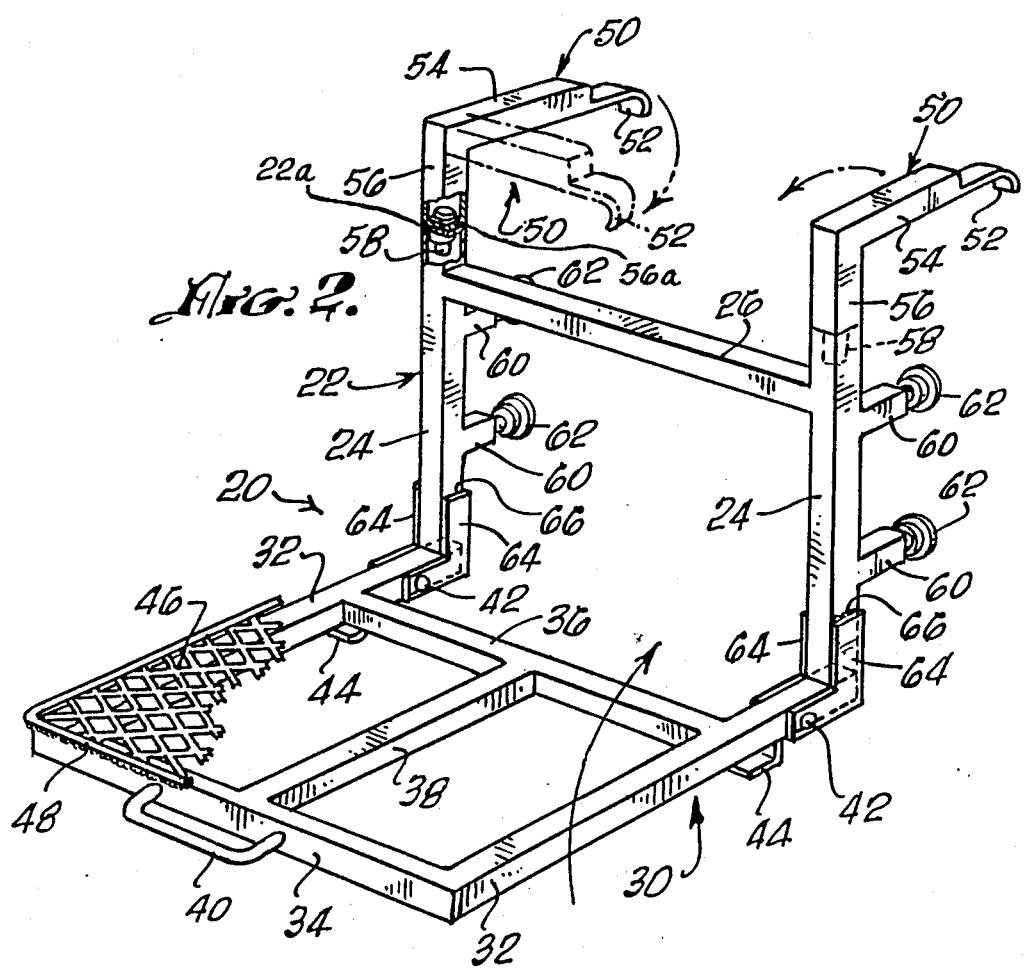
FIG. 2 is an enlarged, partially broken away, perspective of the preferred embodiment being used in FIG. 1.

Examining the apparatus 20 more closely in FIG. 2 it is seen that there are a pair of arms generally 50 comprising the support members 54 with the extensions and hooks at 52 and the downwardly depending member 56. The end of each member 56 will be flanged as at 56a. A bolt or the like 58 will join the flange 56a with a flange 22a on each member 22 to which it matches. In this manner the arms 54 may be pivoted to the position shown in phantom for storage. The bolts or the like 58 will be installed by pressing into a self-locking nut arrangements on each end, as is known to those skilled in the art, or by being assembled prior to the final welding or other affixing of the flanges 56a and 22a.

The lower framework upon which the arms 50 (54) pivot comprise two downwardly depending members 24 with a cross brace 26 welded or otherwise affixed between them. Further, L shaped brackets 64 will be affixed t the members 24 by welding or the like. These L shaped members 64 will be appropriately drilled and the side members 32 of the step portion will be drilled so as to be pivotally mounted at 66 by a bolt or the like 42 as indicated. The step member itself comprises the frame members 32, 34, 38 and 36 which will be welded or otherwise formed to create a rigid frame for the step material 46 which is shown broken away but is understood to cover the entire step platform up to the point where it will not interfere with hinging motion short of the pivot area at 42. Step material 36 is an expanded metal or the like so as to provide a safe working area and one through which dirt and the like upon the mechanic's shoes may drop and not accumulate. The round metal bead element 48 will surround the edge of the expanded metal 46 so as prevent injury from scratching or the like on the rough edges.

There will be four brace members 60 having adjustable extensions 62 as indicated. These extensions 62 will be threaded and will be movable in and out through a threaded arrangement in a closed end of each one, which is not shown in detail in this drawing, but which is shown in the alternate embodiment illustrated in FIGS. 3, 4 and 5, it being understood the adjustment of the members 62 will be the same as the adjustment of the members 162 shown in the latter named figures.

The adjustment of these legs 60-62 is quite important. In the illustration of FIG. 1 it will be seen that the upper pair of legs 60-62 only are pressing against the bumper 18. However, there will be some bumper configurations which will be such that the ideal position for the legs 60-62 to press against the bumper will be lower and there will be some in which it will be ideal to have both pairs of feet pressing against the bumper. Also in some instances there are openings in the bumpers of trucks and the like and having the dual pair of feet insures a proper adjustable position against the bumper of the vehicle.

As shown in the illustration of FIG. 2 there are two hook-like elements 44 which will be welded or otherwise affixed to the frame members 32. These elements can be used to hang on the edge of the mechanic's work cabinet, or working cart, or otherwise for storage when the item is folded completely. When folded completely it will be seen that the arms 50-54 are swung inwardly and the step portion is lifted by the handle 40 so as to collapse and assume a position of minimum storage space.

Examining FIGS. 3, 4, 5, and 6, an alternate embodiment of a step utilizing the principles of this invention is indicated. In FIG. 3 the bumper 18 of the vehicle in FIG. 1 is shown in section with this alternate embodiment shown in place rather than the embodiment shown in FIG. 1. It is noted that the hook elements 152 attached to the pivotally mounted members 154 grip the bumper at its upper edge as shown. In this embodiment only one pair of feet 160-162 are shown and they are attached to frame member 124. It is understood that there will be two identical frame members and all of the elements except the truck bumper will be duplicated.

In this case a pair of L shaped hinge devices 164 will be provided and likewise a pair of L shaped hinge devices 165 will be provided. It will be noted in FIG. 4 how the step platform has pivoted up around the bolt 142 which is affixed through holes in one leg of the L shaped member 164 and likewise at the upper end a bolt 158 will be affixed through holes in the leg of the L shaped member 165 and through the arm member 154. This will be in a manner similar to the pivoting around bolt 42 shown and described previously in connection with FIG. 2.

The step frame will consist of members 132, 134, 136 and any further bracing which may be desired with the expanded metal step 146 mounted thereon by welding or the like and the bead at 148 to protect the edges as previously described.

In FIGS. 3, 4, 5, and 6 the feet members 160-162 are shown to include a closed end on 160 with a threaded hole at 160a and the foot member 162 has a threaded stem 162a which screws in and out of the threads at 160a. The foot members 162 and 160 can be either members as shown here or preferably will be double members as shown in the embodiment of FIG. 2. When being carried on a mechanic's cart or the like the hook members 144 will hook over the edge 300 of a mechanic's tool box, tool cabinet, working cart, or the like as shown particularly in FIG. 5.

At FIG. 6 the action of the hinging arrangement around bolt 142 is shown wherein it is indicated that the frame member 130 has been drilled and likewise the L shaped hinging member 142 have been drilled thus allowing the pivoting around bolt 142. It will be observed that when the step is arranged for use as shown in FIG. 3 that the ends of frame members 132 at the hinged area press against the ends of the frame members 122 so as to provide a safe and sure stop against any undesired movement. The same affect is also achieved at the upper end of frame member 122 wherein the arm member 154 will press downwardly against the end of the frame member. The hinging arrangement around bolt 158 will be the same as the hinging arrangement shown in detail in FIG. 6.

FIG. 7 illustrates a bus generally 210 having windshield 214 bumper 218 and utilizing the step 20, being the embodiment of FIG. 1. It is to be recognized that the embodiments of FIGS. 3, 4, 5, and 6 can also be used effectively in this position. It should further be noted in connection with FIG. 7 that the vehicle has tires 600. The importance of the tires 600 will be discussed in connection with the description of FIG. 10 below.

In FIG. 8 there is illustrated a mechanic's tool cabinet 300 having a ledge portion 322 suitable to mount the embodiment 120 as illustrated. Thus a mechanic has such a step with him at all times for use as needed.

At FIG. 9 there is illustrated a mechanic's work cart upon which is mounted the embodiment of FIG. 2. This again is an extreme advantage to be able to mount on the upper ledge of the cart 400 so as to readily have the step available and yet it's mounting is such that so as to not take up undue amount of space.

FIGS. 10 and 11 illustrate the use of a step of the embodiment 120 with minor modifications so it can be utilized over a tire such as the bus tires. It will be noted that by utilizing the device in this manner on the bus of FIG. 7 most of the windows of the bus can be readily accessed. In FIG. 10 the step 120 is shown to be equipped with a tire gripping modification 500 which is held in place by being inserted into the tubing members 154, which are hollow and thus can accommodate the rod members 502. In this case a slight modification has been made wherein a nut or the like 505 has been provided and the member 154 has been drilled beneath the nut. The nut is either welded or otherwise affixed to the arm 154 and the wing bolt 506 will have threads which match the nut 505 and by being turned down against the arms 502 will hold them in firm contact with the step 120. The members 502 will then slip over the tire 600 as illustrated in FIG. 10 and the member 504 formed at the end of the arms 502 will hold the step against the tire as shown. It is to be understood that a tire gripping device of the nature of device 500 could also be permanently affixed or permanently and intregally formed with the step itself if desired.

FIGS. 12, 13 and 14 taken together show a further alternate embodiment of a device embodying the principals of this invention. In FIG. 12 it is seen that 2 upstanding arms 724 are hinged in a manner similar to the other embodiments to a step generally 746 of a construction similar to that shown in the foregoing illustration. The hinged step can fold up against the leg 724. At 744 are shown 2 hanger brackets which will be utilized to hang this on a mechanic's tool box or the like.

In this particular embodiment 2 legs of strap iron or the like are configured as shown and they are welded at each end to the leg 724. Each of the legs has a covering on the most outwardly depending portion at 763. This covering will be for the purpose of protecting the vehicle bumper from scratches by the bent strap iron 762 and may be formed of felt or other protective material. Additionally there will be a pad of a similar material at 770 or individual smaller units of such material which will protect a mechanic's tool box or the like upon which the device may be hung from scratching.

In FIG. 12 there is shown generally 700 an alternate embodiment of a member to slip-over a truck tire in a manner similar to that shown in FIG. 11. In this case however the arms 702 and the arm 704 have been formed of rectangular tubular material as shown. Each of the arms 702 has a series of holes 710 and the arm is held in position at the upper end by means of a pin or the like 706 held in position by a cotter pin 707 or the like. Thus the arm 702-704-702 can pivot and fold when in place and being used as a tire hanger or to be use as such. The construction of the hinge at the upper end will be similar to that shown in FIGS. 3, 4 and 5.

By having the element mounted by the pin 706 the pins may be removed and the tire bracket 700 may be removed. Thereafter, a bumper bracket 752-754 having a hole appropriately placed therein may be used in lie of the wheel bracket and may be mounted and held in place by the pin 706 and cotter pin 707. Thus, this particular embodiment can be used both for a bumper mounted device or for a wheel mounted device.

If desired, for relatively permanent use upon one vehicle or the like, after proper adjustment to such a vehicle either of the embodiments shown herein or any other embodiment utilizing the principles of this invention could be welded, bolted, or otherwise so affixed and configured that it would permanently maintain its step position. Such would generally not be desirable unless it was in a condition where when, and if, removed, it would not create a storage problem.

In each of the embodiments shown, it is most desirable that all of the framework members, arms, support members, and the lie, be of hollow, rectangular material such as metallic tubing. By being of hollow material it is most convenient to close ends, drill holes, attach threaded items, threaded drilled holes, and the like, so as to provide for ready adjustment of feet, holding elements, and the like. Likewise, such material is relatively stronger and lighter in weight than most materials.

While the embodiments of this invention shown and described are fully capable of achieving the objects and advantages desired, it is to be understood that such embodiments are for purposes of illustration only and not for purposes of limitation.

I claim:

1. A portable step to be used in cooperation with automotive vehicles comprising in combination: a step member consisting of a frame of tubular material having at least two basic support frame members parallel to one another and a third end frame member attached to one end of each of the basic support frame members; at least one intermediate support frame member parallel to and between the two basic support frame members extending a distance from the end frame member; a transverse member fastened between the two basic support frame members and fastened to the intermediate support frame member; a platform comprising expanded metal with a bead around the outer edge thereof fastened to the basic support frame members and the transverse member the intermediate support frame member and end frame members; a hole drilled through each of the basic support frame members near the ends thereof; a pair of L shaped members on the exterior of each of said basic support frame members drilled in a first leg of each so as to match the hole in each of the basic support frame members and fastened thereto by a bolt through all of said holes in such manner that the platform may be pivotally moved with relation to the L shaped members; a pair of vertical support members of hollow tubular material welded or otherwise affixed at a first end to the second leg of all of said L shaped members so as to comprise two pivotal mounting arrangements on said vertical support members; a leg formed of hollow tubular material fastened to each of said vertical support members depending in a direction away from the direction of said platform, each of said members having a closed end away from the vertical support member said closed end having an opening therein which is threaded; a support foot attached to an elongated threaded member engaged in the threads of each of said leg members in such manner that the foot support member may be adjusted inwardly or outwardly with relation to the vertical support members; an arm member formed of hollow tubular material pivotally mounted to the second end of each of said vertical support members said arm member terminating in an extension of one portion of the tubular material, the other portions thereof having been cut away, and said extension thereof terminating in a hook arrangement suitable to engage with and hold upon the upper portion of an automotive vehicle bumper; and mounting means attached to said entire device in such manner as to allow the device to be hung upon a ledge.

2. A portable and removable work step to be used in conjunction with automotive vehicles comprising: a pair of hook-like members suitable to engage with and grip upon the upper edge of a bumper of an automotive vehicle; a pair of arms depending outwardly from said hook-like members for a distance; a pair of support members pivotally attached to said arm members and depending therefrom at a 90 degree relationship to said arm members; a frame comprising a pair of frame members pivotally attached to said pair of support members and carrying supporting brace members; at least one pair of support feet carried by the support members in such manner as to rest against the bumper upon which the hook-like members are engages; a platform to stand upon mounted upon the frame members; and storage carrying members attached to the frame members and beneath the platform in such manner that the storage carrying members may engage a horizontally and vertically exposed member of a mechanic's work cabinet.

3. The apparatus of claim 2 in which there are at least two pairs of support feet members.

4. The apparatus of claim 2 wherein the arm members are each hollow and each has a threaded means attached thereto and intercommunicating to the interior thereof and a threaded bolt member cooperative therewith extending into the interior of the hollow arms.

5. The apparatus of claim 4 wherein means to grip over the top of an automotive tire is provided in conjunction with the arms and the pair of adjustable foot support members is adjustable against the tire in such manner that the entire apparatus may be affixed safely upon an automotive vehicle tire.

6. The apparatus of claim 5 wherein the means to grip over the top of an automotive tire is adjustable with relation to the arms.

* * * * *